Feb. 6, 1951     H. A. RANDALL     2,540,289
LATHE TOOLHOLDER
Filed June 13, 1947
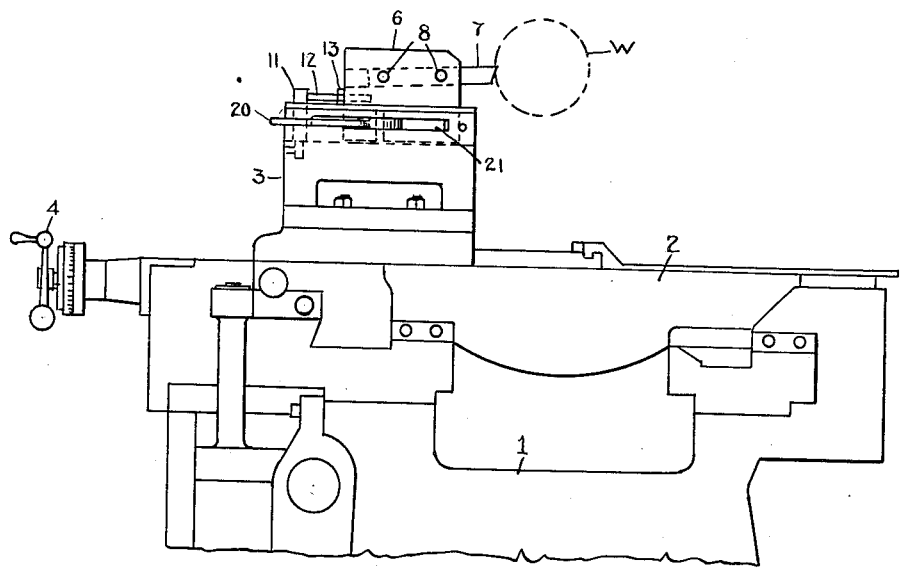
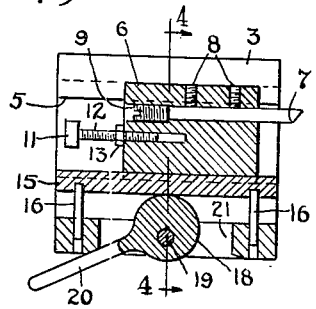
Fig. 2
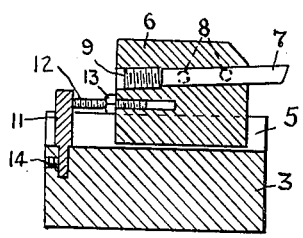
Fig. 3
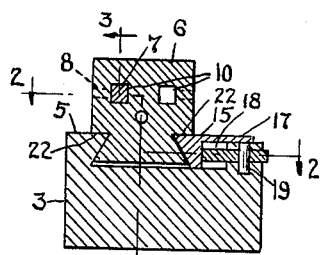
Fig. 4
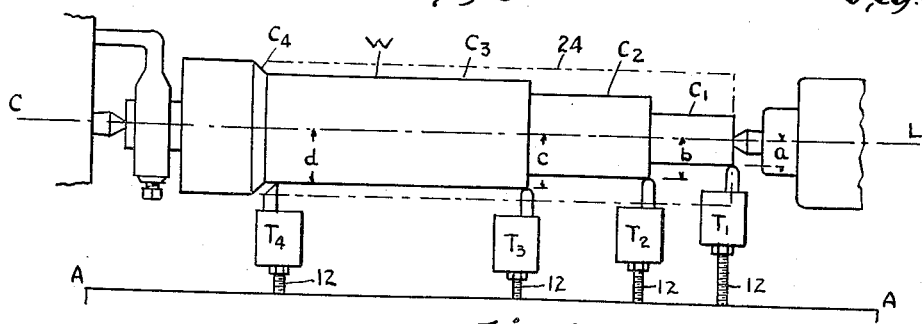
Fig. 6
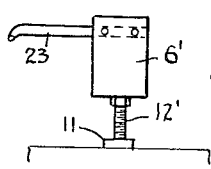
Fig. 5
INVENTOR.
HARRY A. RANDALL
BY
Oberlin & Limbach
ATTORNEYS.

Patented Feb. 6, 1951

2,540,289

UNITED STATES PATENT OFFICE 2,540,289

LATHE TOOL HOLDER

Harry A. Randall, Rocky River, Ohio

Application June 13, 1947, Serial No. 754,526

2 Claims. (Cl. 82—36)

The present invention relates to an improvement in the operation of turning lathes whereby highly accurate and uniform workpieces may be produced thereon by relatively unskilled operators, and at a high rate of production. My invention has more particular reference to a lathe tool holding device and a method of manipulating and controlling the same whereby extremely accurate control of the amount or depth of tool infeed is obtained.

Heretofore, in the operation of turning lathes, such as the ordinary engine lathe, it has been the customary practice to control the turning or cutting tool infeed by a "cut and try" procedure. This involved the hand infeeding of the turning tool to a depth which in the judgment of the operator was just short of that specified in the resultant workpiece, and then gradually working it closer to the final desired diameter, as indicated by a gauge such as a pair of calipers or a fixed micrometer or vernier gauge. Obviously, such procedure, in order to produce highly accurate work, has required highly skilled and experienced operators.

My invention overcomes the above indicated difficulty, and at the same time greatly increases the productive capacity of a turning lathe. Briefly outlined, the principle of my invention involves the provision of a lathe turning tool holding device or block which is individual to each particular tool to be used for each individual cutting operation. Such tool holding device is removably mounted in the lathe cross slide, and includes means for predeterminedly setting the position of the cutting edge of the tool with respect to a fixed point in the cross slide; or, alternatively, a predetermined distance from the axis of the workpiece. Thus, the infeed depth of each tool is fixed beforehand for the operator, the original set-up of each tool in its individual holder accurately controlling each different cutting depth. The exact depth of infeed to obtain the desired precision and accuracy in the workpiece is thereby achieved by a relatively unskilled operator who needs but simply change each tool holding block in the cross slide for each tool cutting operation and start the tool carriage on its next longitudinal traverse. As an alternative procedure the present invention also contemplates the use of a single tool holding block which is predeterminedly shifted relative to the workpiece by the insertion and removal of spacing blocks of desired thickness interposed between the tool holding block and the fixed point on the cross slide.

Additional objects and advantages of my invention shall become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is an end elevational view from the tail-stock end and with the tail-stock removed, of a lathe, and showing the device embodying the principle of my invention as assembled thereon;

Fig. 2 is a sectional view of the lathe tool holder device taken substantially along line 2—2 of Fig. 4;

Fig. 3 is a sectional view taken substantially along line 3—3 of Fig. 4;

Fig. 4 is a sectional view taken substantially along line 4—4 of Fig. 2;

Fig. 5 is a top plan view of an alternative form of tool holder adapted for holding a boring tool; and Fig. 6 is a more or less diagrammatic view illustrating one principle and method of operation of my invention.

Now referring more particularly to the drawing, there is shown therein a lathe comprising the bed 1, with the tool carriage 2 adapted to move longitudinally thereon and parallel to the axis of the workpiece W. A cross slide 3 is mounted on the carriage 2 and is movable toward and away from the axis of the workpiece such as by means of the cross slide crank 4.

A slideway 5 is provided on the top of the cross slide 3 and is adapted to receive the block 6 which holds the lathe tool 7. The lathe tool 7 is received in one of two or more complementary bores 10 in the block 6 and held in fixed position therein by means of the set screws 8. Although the tool 7 is shown as being of square cross section in the accompanying drawing, it will be obvious to those skilled in the art that it can equally well be of round, rectangular or polygonal cross sectional form. A set screw 9 is provided in the outer end of the bore receiving the lathe tool 7 and adapted to bear against the butt end of the latter for effecting minor adjustments of the tool 7 in the block 6.

It will be observed that because the lathe tool receiving bores 10 in block 6 are inclined upwardly toward the workpiece, manipulation of screw 9 will not only effect movement of the tool 7 longitudinally of its axis but will simultaneously raise or lower the cutting edge thereof to thus accurately adjust the cutting edge relative to a horizontal plane through the axis of the workpiece. Furthermore, the provision of several tool receiving bores 10 in block 6 makes possible the clamping of tool 7 into the bore best suited for the particular operation with regard to clearance between the block 6 and parts of the lathe or portions of the workpiece. This avoids the necessity of providing an excessive overhang of the tool 7 from the block 6. The tool 7 is rigidly held in block 6 by the screws 8 which preferably bear on one side of the tool and by the screw 9, said latter screw being operative to positively resist any longitudinal slipping of the tool 7 relative to the block 6.

A fixed abutment 11 of hardened metal projects upwardly from the outer end of the cross slide 3 to provide a hardened metal face against which the end of the screw shaft 12 is adapted to contact. The shaft 12 threadably engages in the block 6 and is locked in adjustable position therein by means of the locknut 13. The abutment 11 is preferably in the form of a separate part fitted into a bore in cross-slide 3 and held therein as by a screw 14 in threaded engagement with the cross-slide.

One side of the slideway 5 is formed by the movable gib 15 which is retained in place by means of pins 16 projecting therefrom and slidably received in bores in the cross-slide 3. As best shown in Fig. 4, the gib 15 is provided with a flange 17 for preventing chips and dirt from fouling the free sliding action of the gib. An eccentric or cam 18 movable in a slot 21 through the cross-slide 3 and engageable with gib 15 is mounted on a pivot pin 19 which passes through such slot. Said cam has a manipulating handle 20 thereon. Thus, by turning the handle 20, the cam 18 is caused to clamp the gib 15 tightly against the block 6 and thus to lock the latter in fixed position within the slideway 5. The projecting length of the shaft 11 determines the relative longitudinal position of the block 6 in the slideway 5. The slideway 5 is so formed that movement of the gib 15 as aforesaid will effect firm seating of the block 6 on the cross-slide 3 along the areas designated by the numerals 22 in Fig. 4. It will be observed that when the handle 20 is manipulated in an opposite direction, the gib 15 may be moved sufficiently to permit the block 6 to be freely lifted vertically.

In Fig. 5, an alternative form of construction is shown wherein a boring tool 23 is mounted in the side of the block 6'. An adjusting and abutment shaft 12', similar to the shaft 12, and for contacting against the abutment 11, is also provided in the block 6'. As in the case of the block 6 in Figs. 1–4, the block 6' may be provided with a tool receiving bore which is inclined from horizontal whereby it will not be necessary to rotate the boring tool 23 about its longitudinal axis in order to properly adjust the height of the cutting edge thereof relative to the workpiece axis.

In one manner of operation, several of the blocks 6 are provided. Individual tools, each adapted for a particular cutting operation, such as rough turning, finish turning, facing, chamfering, threading and boring, are each mounted in an individual block 6. Such tools are so mounted that their cutting edges are spaced from the outer end of the shaft 11 at a predetermined distance which is equal to the distance of such outer end from the axis of the workpiece less the depth of infeed of the cut to be taken by a particular tool. This is best illustrated by reference to Fig. 6, where the line AA represents the inner face of the abutment 11 which is located a predetermined and fixed distance from the center line CL of the workpiece W. Assuming that it is desired to turn a piece of bar stock having the original outline as indicated at 24 into a spindle having the various diameter portions $C_1$, $C_2$, $C_3$ and the chamfered portion $C_4$, then four different tool holding blocks, correspondingly denoted $T_1$, $T_2$, $T_3$ and $T_4$ are provided. The cutting tool mounted in the block $T_1$ is designed to perform the turning operation resulting in the production of the smallest diameter portion $C_1$. Accordingly, the cutting tool in the block $T_1$ is mounted therein, and the screw shaft 12 adjusted to such position that the cutting edge of the tool is the distance $a$ away from the axis CL of the workpiece W. Thereupon, the lathe is started, rotating the workpiece W; and the carriage 2 and cross slide 3 is traversed in a left-hand direction for the required distance to cut the portion $C_1$. At this point, the block $T_2$ is interchanged in the slideway 5 of the cross slide 3 and the longitudinal traverse of the carriage 2 and cross slide 3 continued for the required distance to turn the portion $C_2$.

The succeeding cutting operations are continued, substituting the tools and tool blocks $T_3$ and $T_4$, to turn the portions $C_3$ and $C_4$ respectively. In each case, it will be noted that the cutting edge of the tool is preliminarily set at a distance from the axis CL of the workpiece, corresponding to the desired depth of cut to be made. Thus, the cutting edge of the tool in the block $T_2$ is set the distance $b$ from the line CL, the cutting edge of the tool in the block $T_3$ the distance $c$ from the line CL, and the cutting edge of the chamfering tool in the block $T_4$ the distance $d$ from the same center line CL.

It will thus be seen that all that the operator has to do, in order to obtain a thoroughly accurate cut, is to substitute the tool holding blocks $T_1$, etc., in sequence as each longitudinal traverse end point for individual cutting operations is reached. It is not necessary for the operator to use any gauges, calipers or the like, or to manipulate infeeding cranks or to read measurement dials thereon. The cross slide 3, once set in the desired fixed position, remains therein throughout all operations. In a lathe in which multiple carriage stops are provided, the operating procedure is rendered all the more fool-proof and accurate since it is merely necessary for the operator to change each tool block $T_1$ etc. as the carriage 2 reaches a stop and substitute the necessary higher numbered tool block in the series. Thus, relatively unskilled operators, by the use of my invention, are enabled to produce highly accurate and precise lathe work, at high rates of production, and in which each workpiece is uniformly duplicated.

As an alternative manner of operation, instead of changing the adjustment of the tool 7 in the block 6, or changing the adjustment of screw 12 carried by said block and constituting one of the abutment means for determining the position of the block in the slide 3, it may be found convenient to insert a spacing block between such abutments 11 and 12, when it is desired to increase the depth of cut taken by said tool by a stated amount. For example, if the tool be set normally to cut a part to a 2" diameter, by inserting a ¼" block at the point in question, such tool will be set to reduce such part to 1½" diameter. A plurality of such gauge blocks, accurately dimensioned to provide different thicknesses, may be provided so as thus correspondingly to vary the setting of the lathe tool for operational purposes without requiring any change in the adjustment of the tool in its mounting or of the screw 12. Obviously, were it desired to first make a cut of smaller diameter and then a cut of larger diameter of given amount measuring by such a gauge block, the block can be inserted initially and then removed and the tool holding block 6 shifted until the screw 12 contacts with abutment 11 on the slide.

Other modes of applying the principle of the invention may be employed, change being made as regards the details described, provided the features stated in any of the following claims or the equivalent of such be employed.

I therefore particularly point out and distinctly claim as my invention:

1. A lathe tool holding device comprising a slide, a tool holding block fitting said slide, abutment means carried by said slide and by said block for determining the position of said block in said slide, a transversely movable gib forming one side of said slide, a locking cam bearing against one side of said gib for clamping said block in said slide, and mutually slidably engaged guide means on said gib and slide comprising transversely projecting pins fixed on one of them longitudinally slidably received in bores in the other of them.

2. A lathe tool holding device comprising a slide, a tool holding block fitting said slide, abutment means carried by said slide and by said block for determining the position of said block in said slide, a transversely movable gib forming one side of said slide, a locking cam bearing against one side of said gib for clamping said block in said slide, and mutually slidably engaged guide means on said gib and slide comprising transversely projecting pins fixed on one of them longitudinally slidably received in bores in the other of them, said slide being formed with a longitudinally extending slot therethrough, and a pin extending transversely through such slot, said locking cam fitting into such slot and rotatably supported by said pin.

HARRY A. RANDALL.

REFERENCES CITED

The following references are of record in the file of this patent:

UNITED STATES PATENTS

| Number | Name | Date |
|---|---|---|
| 646,390 | Parsons | Mar. 27, 1900 |
| 1,230,032 | Riddle | June 12, 1917 |
| 1,795,594 | Class | Mar. 10, 1931 |
| 1,835,328 | Parsons | Dec. 8, 1931 |
| 1,920,209 | Norton | Aug. 1, 1933 |
| 2,002,933 | Buell | May 28, 1935 |
| 2,011,086 | Shaw | Aug. 13, 1935 |
| 2,320,776 | Gorton | June 1, 1943 |